UNITED STATES PATENT OFFICE 1,986,876

PRODUCTION OF UNSATURATED COMPOUNDS

John P. Baxter, William A. M. Edwards, and Ramsay Middleton Winter, Norton-on-Tees, England, assignors to Imperial Chemical Industries Limited, a corporation of Great Britain No Drawing. Application September 10, 1931, Serial No. 562,190. In Great Britain September 19, 1930

10 Claims. (Cl. 260—170)

This invention relates to the production of valuable compounds such as acetylene and vinyl chloride from olefine dichlorides of the type of ethylene dichloride or 1.2 dichloro-propane by thermal decomposition, and in particular to the production of acetylene and vinyl chloride from ethylene dichloride.

It is known (Biltz:—Berichte 35, 3524 and 37, 2398) that ethylene dichloride on heating to a temperature of about 400° C. gives rise to vinyl chloride. We have now found, however, that this is only an isolated example of the different manners in which a dichloro hydrocarbon of the type of ethylene dichloride can undergo thermal decomposition, and that by careful regulation of the reaction conditions, viz. temperature, pressure, time of reaction, nature and amount of diluents, valuable products, such as acetylene and vinyl chloride, may be obtained in good yield. Thus for instance the decomposition of ethylene dichloride to vinyl chloride takes place more readily and with greater freedom from carbon deposition if the reaction be effected in the presence of steam. A similar reaction may also be brought about in the case of propylene dichloride, which on heating to temperatures of the order of 400° C.–600° C. yields chloropropylene, the reaction again being favored by the presence of steam as a diluent. Hydrogen chloride or inert gases such as nitrogen and carbon dioxide may also be used as diluents. The reaction is also favored by operating under reduced pressure.

We have furthermore found that at higher temperatures of the order of 800° C.–900° C. the decomposition takes place with the formation of a hydrocarbon of the acetylene series. Thus ethylene dichloride gives rise to acetylene and propylene dichloride to allylene. The yield of acetylene hydrocarbons is favored by the presence of diluents such as steam or by working under reduced pressure.

According to the present invention, therefore, olefine dichlorides are decomposed by heating to an elevated temperature, preferably above 800° C. and preferably in the presence of an inert diluent, to yield unsaturated hydrocarbons of the acetylene series, or to a substantially lower temperature in the presence of an inert diluent to yield unsaturated chlorinated hydrocarbons of the type of vinyl chloride. In each case the length of reaction period is preferably so chosen that the optimum yield of desired product may be obtained.

According to a preferred form of the invention ethylene dichloride is heated to a temperature between 800° C. and 1000° C. with steam as a diluent in proportion of at least 8 volumes of steam to 1 of ethylene dichloride vapor with a time of contact varying between 1 to 6 seconds depending on the temperature employed. In general, with any given steam ratio a short time of contact affords a poor yield of acetylene and some proportion of vinyl chloride, this latter falling off with increased time of contact and the yield of acetylene rising to a maximum. With too long a period of contact the yield of acetylene also begins to fall owing to carbon formation.

In carrying out the invention the olefine dichloride vapor, mixed if required with the diluent, is passed through a heated reaction chamber, e. g. a tube, which may be unpacked or packed with inert material such as pumice or with catalytic material. The gaseous products are rapidly cooled and the hydrogen chloride formed by the reaction is absorbed in the water which is condensed. The vinyl chloride may be removed from the residual gas by cooling to −50° C., leaving the acetylene in gaseous form. No polymerization of the acetylene or vinyl chloride is observed when working in this manner.

The following tables illustrate, in the case of ethylene dichloride, the variation of the yields of acetylene and vinyl chloride according to the reaction conditions. Similar behavior is to be expected in the case of other olefine dichlorides.

Table I

Reaction mixture:—8 volumes of steam
 1 volume of ethylene dichloride vapor
Temperature:— 800° C.

| Contact time | Yield of acetylene | Yield of vinyl chloride |
|---|---|---|
| Seconds | Percent | Percent |
| 2.0 | 22 | 52 |
| 4.3 | 41 | 31 |
| 5.1 | 48 | 10 |
| 6.4 | 53 | 9 |

Table II

Reaction mixture:—8 volumes of steam
 1 volume of ethylene dichloride vapor
Temperature:— 850° C.

| Contact time | Yield of acetylene | Yield of vinyl chloride |
|---|---|---|
| Seconds | Percent | Percent |
| 0.8 | 25 | 50 |
| 1.4 | 35 | 35 |
| 2.5 | 42 | 21 |
| 3.4 | 50 | 11 |
| 5.1 | 47 | 13 |

Table III

Reaction mixture:— 8 volumes of steam
1 volume of ethylene dichloride vapor
Temperature:— 900° C.

| Contact time | Yield of acetylene | Yield of vinyl chloride |
|---|---|---|
| Seconds | Percent | Percent |
| 1.0 | 47 | 10 |
| 1.7 | 53 | 12 |
| 2.1 | 53 | 15 |
| 2.4 | 55 | 5 |
| 3.0 | 44 | 5 |
| 3.3 | 41 | 5 |
| 4.1 | 29 | 5 |

Table IV

Reaction mixture:— 16 volumes of steam
1 volume of ethylene dichloride vapor
Temperature:— 900° C.

| Contact time | Yield of acetylene | Yield of vinyl chloride |
|---|---|---|
| Seconds | Percent | Percent |
| 1.5 | 66 | 5 |
| 2.0 | 70 | 10 |
| 3.0 | 63 | 5 |

Table V

Reaction mixture:— 16 volumes of steam
1 volume of ethylene dichloride vapor
Temperature:— 1000° C.

| Contact time | Yield of acetylene | Yield of vinyl chloride |
|---|---|---|
| Seconds | Percent | |
| 0.9 | 46 | Nil |
| 1.9 | 66 | Nil |
| 3.5 | 65 | Nil |
| 8.1 | 55 | Nil |
| 13.1 | 29 | Nil |

Table VI

Temperature:— 800° C.
Contact time:— 6 seconds

| Reaction mixture | | Yield of acetylene | Yield of vinyl chloride |
|---|---|---|---|
| Steam | Ethylene dichloride vapor | | |
| Volumes | Volume | Percent | Percent |
| 8 | 1 | 53 | 9 |
| 4 | 1 | 34 | 30 |
| 2 | 1 | 26 | 33 |
| 1 | 1 | 28 | 35 |

As many apparent and widely different embodiments of this invention may be made without departing from the spirit thereof, it is to be understood that we do not limit ourselves to the foregoing examples or description except as indicated in the following claims.

We claim:

1. A process for the production of a hydrocarbon of the acetylene series which comprises heating an olefine dichloride to at least substantially 800° C.

2. A process for the production of a hydrocarbon of the acetylene series which comprises heating an olefine dichloride to at least substantially 800° C. in the presence of an inert diluent.

3. The process of claim 2 in which the reaction is carried out under reduced pressure.

4. The process of claim 2 in which the inert diluent is steam.

5. The process of claim 2 wherein the volume of inert diluent exceeds that of the olefine dichloride vapor.

6. The process of claim 2 wherein ethylene dichloride is treated for from 1 to 6 seconds to produce acetylene.

7. The process of producing acetylene which comprises passing 1 volume of ethylene dichloride vapor together with substantially 8 volumes of steam through a reaction chamber at a temperature of from 800° C. to 1000° C. in from 1 to 6 seconds.

8. The process of producing acetylene which comprises passing 1 volume of ethylene dichloride vapor together with at least substantially 8 volumes of steam through a reaction chamber at a temperature of at least 800° C. and controlling the contact time to obtain a maximum yield of acetylene.

9. A process for the production of unsaturated compounds which comprises heating 1 volume of olefine dichloride vapor to at least substantially 800° C. in the presence of at least 8 volumes of an inert diluent.

10. The process of producing a hydrocarbon of the acetylene series which comprises passing the vapor of an olefine dichloride together with at least an equal volume of steam through the reaction chamber at a temperature of at least 800° C. in from 1 to 13 seconds.

JOHN P. BAXTER.
WILLIAM A. M. EDWARDS.
RAMSAY MIDDLETON WINTER.